The specification
is not in
8425X
J. St. John
Domestic Oven.
Patented Sept. 30, 1834.
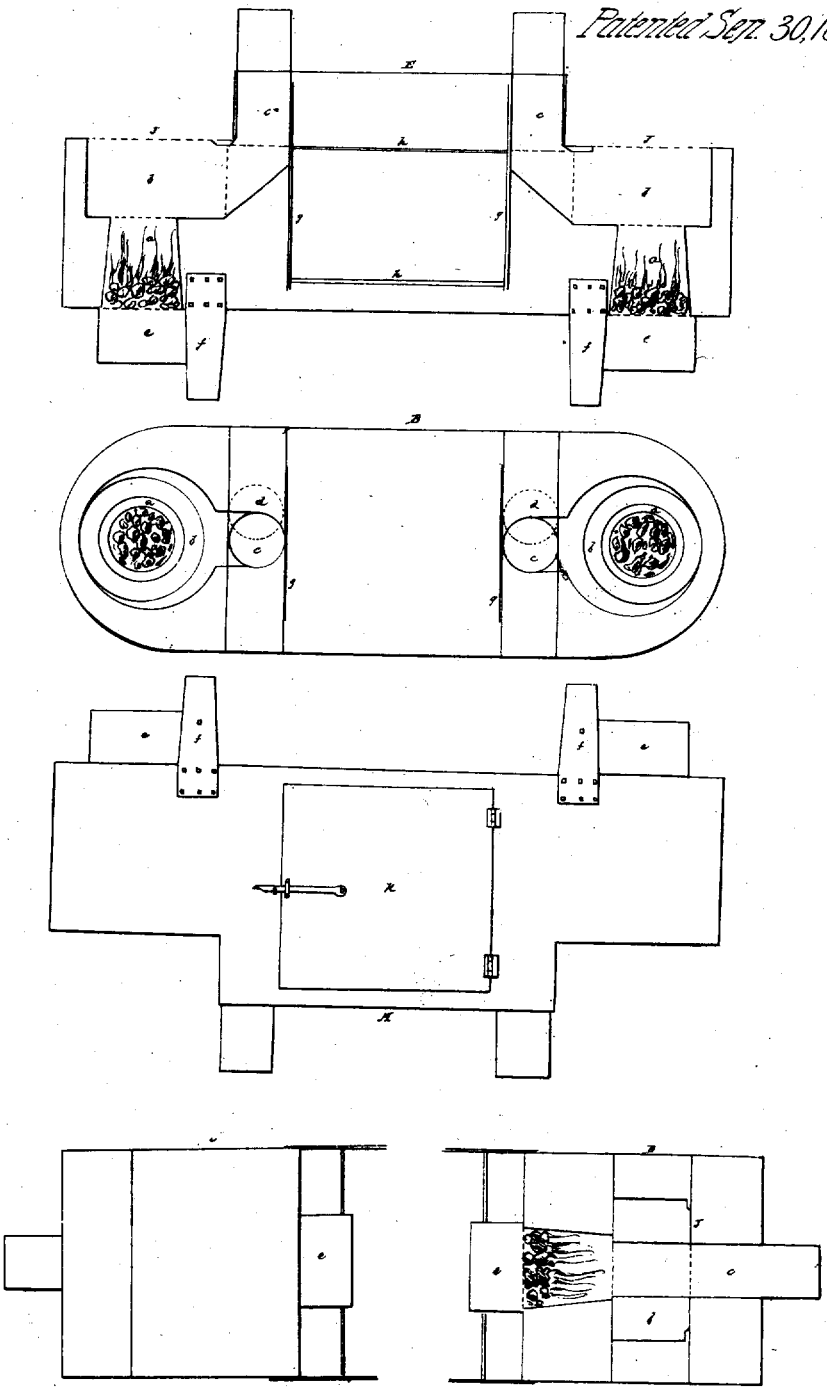
THE NORRIS PETERS CO., WASHINGTON, D. C.

Josiah St. John
Letters Patent

The schedule referred to in these Letters Patent and making part of the same containing a description in the words of the said Josiah St. John himself of his improvement in tin or other metal bakers.

To all to whom these presents shall come Be it known that I Josiah St. John of the City of Hudson in the County of Columbia and State of New York have invented a new and useful improvement in tin or other metal bakers and that the following is a full and exact description of the construction and operation of said baker as improved by me. This baker may be made of tin, sheet iron or any other metal and of any convenient size or shape. For the better understanding it suppose one constructed of tin of the following shape and dimensions. The body in which is the oven two feet in length by one foot in height and width with a door on the side in front. On either end a projection for the furnace in a circular form eight inches in length and nine inches in height; with a circular opening in the top of six inches in diameter in which to set the teakettle or other boiler. In each end is placed the furnace (a.a.&c.) cone shaped with a grate at the bottom, on which the coal or other fuel lies under each furnace (C.C.&c) is an ash pan. Over and fitted round the top of the furnace is a drum (b.b.&c) over which or rather into the top of which the boiler (d.d.) is placed, and from the side of which leads the flue or chimney (e.e.&c) either out at the top of the baker in which case an additional oven may be put on the top and heat[ed] from the flue or chimney, or the flue or chimney may be lead out at the back of the projection or end of the baker which said projection or end may be square or circular and the top of it depressed as above a level with the top of the baker as convenience or taste may dictate. Near the top of the flue or chimney is fixed a damper Drawing

[illegible]

pes (d,d,) by which the heat in the oven may be the better regulated.
In the oven and near each furnace stands a plate of sheet iron
not extending to the sides all around (g,g, &c) for the purpose of break-
ing and equalizing the heat of the furnace in the oven. In the sides
of these plates are made convenient places for putting in horizon
tal rods (h,h,) or plates upon which to set the necessary vessels
used to bake in. The baker stands on legs (f,f, &c) and has
a pair of handles or rings fixed into the top to lift and re-
move it by. The furnace may be round or square and the
whole of almost any shape or size to suit the buyer. Now what
I claim as my invention or improvement in the tin or other met-
al baker is First the boiling or heating of liquids as well as baking
at the same time and with the heat of the same fuel. And Second-
ly the combination and application of so many of the known parts
and principles of machinery not before combined and applied in
regard to the said baker as are necessary to produce the double
effect aforesaid. to wit, that of boiling and baking at the same
time, as aforesaid Witnesses Josiah St. John J. Mc Cugg Nathaniel Winslow 672 [illegible]

[illegible]

Drawing